(12) United States Patent
Keady

(10) Patent No.: US 11,159,876 B2
(45) Date of Patent: *Oct. 26, 2021

(54) INVERTED BALLOON SYSTEM AND INFLATION MANAGEMENT SYSTEM

(71) Applicant: Staton Techiya LLC, Delray Beach, FL (US)

(72) Inventor: John Patrick Keady, Fairfax Station, VA (US)

(73) Assignee: Staton Techiya LLC, Delray Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/549,410

(22) Filed: Aug. 23, 2019

(65) Prior Publication Data

US 2019/0387305 A1     Dec. 19, 2019

Related U.S. Application Data

(63) Continuation of application No. 15/791,038, filed on Oct. 23, 2017, now Pat. No. 10,455,315, which is a
(Continued)

(51) Int. Cl.
*H04R 1/10*     (2006.01)
*B29C 65/00*     (2006.01)

(52) U.S. Cl.
CPC ......... *H04R 1/1058* (2013.01); *H04R 1/1091* (2013.01); *B29C 66/1122* (2013.01); *B29C 66/301* (2013.01); *B29C 66/5221* (2013.01); *B29C 66/532* (2013.01); *B29C 66/53245* (2013.01); *H04R 2201/105* (2013.01); *H04R 2460/17* (2013.01); *Y10T 156/1051* (2015.01)

(58) Field of Classification Search
CPC .............. B29C 66/1122; B29C 66/301; B29C 66/5221; B29C 66/532; B29C 66/5324; B29C 66/53241; B29C 66/53245; H04R 25/00; H04R 25/60; H04R 25/608; H04R 25/65; H04R 25/652; H04R 25/656; H04R 25/658; H04R 25/456; H04R 1/10; H04R 1/1016; H04R 1/1058; H04R 1/1091; H04R 2225/023; H04R 2201/105; H04R 2460/17; Y10T 156/1051
USPC ...... 156/60, 110.1, 118, 120, 145, 146, 147, 156/196, 227, 242, 244.11, 244.13, 156/244.24, 244.27, 245, 290, 291, 292, 156/293, 294, 296, 308.2, 308.4, 309.6; 381/312, 322, 324, 328, 329, 330, 380
See application file for complete search history.

(56) References Cited

U.S. PATENT DOCUMENTS 2,535,258 A    12/1950  Bland
3,602,654 A     8/1971  Victoreen
(Continued)

*Primary Examiner* — Philip C Tucker
*Assistant Examiner* — Brian R Slawski
(74) *Attorney, Agent, or Firm* — Akerman LLP; Peter A. Chiabotti; Mammen (Roy) P. Zachariah, Jr.

(57) ABSTRACT

At least one exemplary embodiment is directed to an earpiece having a balloon and a stent where the balloon is mounted on the stent and the stent incorporates two or more channels including at least an inflation channel and an acoustic channel. In some embodiments the stent is configured to pass audio signals through the acoustic channel where the acoustic channel is independent of the inflation channel of the balloon. Other embodiments are disclosed.

13 Claims, 7 Drawing Sheets

Related U.S. Application Data continuation of application No. 14/669,602, filed on Mar. 26, 2015, now Pat. No. 9,843,854, which is a continuation of application No. 12/578,461, filed on Oct. 13, 2009, now Pat. No. 8,992,710.

(60) Provisional application No. 61/103,923, filed on Oct. 8, 2008.

(56) References Cited

U.S. PATENT DOCUMENTS

| | | | |
|---|---|---|---|
| 4,029,083 | A * | 6/1977 | Baylor .................. A61B 1/2275 600/559 |
| 4,133,984 | A * | 1/1979 | Akiyama ............. H04R 25/456 181/135 |
| 4,741,344 | A | 5/1988 | Danby et al. |
| 4,834,211 | A | 5/1989 | Bibby |
| 4,896,679 | A | 1/1990 | St. Pierre |
| 4,962,537 | A | 10/1990 | Basel et al. |
| 5,333,622 | A | 8/1994 | Casali et al. |
| 5,483,027 | A | 1/1996 | Krause |
| 5,697,375 | A | 12/1997 | Hickey |
| 6,094,494 | A | 7/2000 | Haroldson |
| 6,256,396 | B1 | 7/2001 | Cushman |
| 6,339,648 | B1 | 1/2002 | McIntosh et al. |
| 6,393,130 | B1 | 5/2002 | Stonikas et al. |
| 6,671,381 | B1 | 12/2003 | Lux-Wellenhof |
| 7,130,437 | B2 | 10/2006 | Stonikas et al. |
| 7,164,775 | B2 | 1/2007 | Meyer et al. |
| 7,227,968 | B2 | 6/2007 | van Halteren et al. |
| 7,362,875 | B2 | 4/2008 | Saxton et al. |
| 7,387,187 | B2 | 6/2008 | Widmer et al. |
| 7,625,371 | B2 | 12/2009 | Morris et al. |
| 7,756,281 | B2 | 7/2010 | Goldstein et al. |
| 8,038,629 | B2 | 10/2011 | Solanki et al. |
| 8,047,207 | B2 | 11/2011 | Perez et al. |
| 8,194,864 | B2 | 6/2012 | Goldstein et al. |
| 8,199,919 | B2 | 6/2012 | Goldstein et al. |
| 8,208,644 | B2 | 6/2012 | Goldstein et al. |
| 8,208,652 | B2 | 6/2012 | Keady |
| 8,221,861 | B2 | 7/2012 | Keady |
| 8,229,128 | B2 | 7/2012 | Keady |
| 8,246,533 | B2 | 8/2012 | Chang et al. |
| 8,251,925 | B2 | 8/2012 | Keady et al. |
| 8,312,960 | B2 | 11/2012 | Keady |
| 8,398,623 | B2 | 3/2013 | Warnking et al. |
| 8,437,492 | B2 | 5/2013 | Goldstein et al. |
| 8,550,206 | B2 | 10/2013 | Keady et al. |
| 8,554,350 | B2 | 10/2013 | Keady et al. |
| 8,600,067 | B2 | 12/2013 | Usher et al. |
| 8,617,152 | B2 | 12/2013 | Werneth et al. |
| 8,631,801 | B2 | 1/2014 | Keady |
| 8,657,064 | B2 | 2/2014 | Staab et al. |
| 8,678,011 | B2 | 3/2014 | Goldstein et al. |
| 8,718,313 | B2 | 5/2014 | Keady |
| 8,808,322 | B2 | 8/2014 | Jones et al. |
| 8,834,461 | B2 | 9/2014 | Werneth et al. |
| 8,848,939 | B2 | 9/2014 | Keady et al. |
| 8,880,195 | B2 | 11/2014 | Asure |
| 8,917,880 | B2 | 12/2014 | Goldstein et al. |
| 8,992,710 | B2 | 3/2015 | Keady |
| 9,113,267 | B2 | 8/2015 | Usher et al. |
| 9,123,323 | B2 | 9/2015 | Keady |
| 9,138,353 | B2 | 9/2015 | Keady |
| 9,185,481 | B2 | 11/2015 | Goldstein et al. |
| 9,216,237 | B2 | 12/2015 | Keady |
| 9,539,147 | B2 | 1/2017 | Keady et al. |
| 9,757,069 | B2 | 9/2017 | Keady et al. |
| 9,781,530 | B2 | 10/2017 | Usher et al. |
| 9,843,854 | B2 | 12/2017 | Keady |
| 10,012,529 | B2 | 7/2018 | Goldstein et al. |
| 10,190,904 | B2 | 1/2019 | Goldstein et al. |
| 2001/0043708 | A1 * | 11/2001 | Brimhall .............. H04R 25/652 381/328 |
| 2002/0196958 | A1 | 12/2002 | Halteren et al. |
| 2003/0023204 | A1 | 1/2003 | Vo et al. |
| 2006/0159298 | A1 | 7/2006 | von Dombrowski et al. |
| 2007/0116319 | A1 | 5/2007 | Hagberg |
| 2008/0144871 | A1 | 6/2008 | Purcell et al. |
| 2009/0071487 | A1 | 3/2009 | Keady |
| 2009/0173353 | A1 | 7/2009 | Purcell et al. |
| 2009/0320858 | A1 | 12/2009 | Purcell et al. |
| 2009/0320859 | A1 | 12/2009 | Purcell et al. |
| 2010/0241256 | A1 | 9/2010 | Goldstein et al. |
| 2013/0098706 | A1 | 4/2013 | Keady |
| 2013/0149192 | A1 | 6/2013 | Keady |
| 2014/0003644 | A1 | 1/2014 | Keady et al. |
| 2014/0026665 | A1 | 1/2014 | Keady |
| 2014/0373854 | A1 | 12/2014 | Keady |
| 2016/0015568 | A1 | 1/2016 | Keady |
| 2016/0192077 | A1 | 6/2016 | Keady |
| 2016/0295311 | A1 | 10/2016 | Keady et al. |
| 2017/0134865 | A1 | 5/2017 | Goldstein et al. |
| 2018/0132048 | A1 | 5/2018 | Usher et al. |
| 2018/0220239 | A1 | 8/2018 | Keady et al. |
| 2019/0082272 | A9 | 3/2019 | Goldstein et al. |

* cited by examiner

INVERTED BALLOON SYSTEM AND INFLATION MANAGEMENT SYSTEM

CROSS-REFERENCE TO RELATED APPLICATIONS

This application is a continuation of U.S. application Ser. No. 15/791,038 filed on 23 Oct. 2017 which is a continuation of U.S. application Ser. No. 14/669,602 filed on 26 Mar. 2015 which is a continuation of Ser. No. 12/578,461 filed 13 Oct. 2009 (U.S. Pat. No. 8,992,710 issued 31 Mar. 2015) and further claims the benefit of U.S. provisional patent application No. 61/103,923 filed 10 Oct. 2008. The disclosure of the aforementioned applications are incorporated herein by reference in their entirety.

FIELD OF THE INVENTION

The embodiments relate in general to pressure management and balloon bonds, and particularly though not exclusively, is related to creating a pressure management system for earpiece systems.

BACKGROUND

Inflatable acoustic systems using balloons can have difficulties in maintaining the bonding of a balloon to a stent upon insertion. In addition there is no pressure management system that has been designed for an inflatable earpiece.

SUMMARY

At least one exemplary embodiment is directed to a method of invert bonding of a balloon comprising: bonding a sheath balloon to a stent at a first bond location, where the sheath balloon has first surface and a second surface, where the bonding at the first bond location is between the stent and a portion of the first surface, where the first surface faces the stent; pulling the sheath balloon from an unbounded end over the first bond to a chosen second bond location so that the first surface faces away from the stent forming an inverted bond at the first bond location; and bonding the sheath at the second bond location where the bonding at the second bond location is between the stent and a portion of the second surface.

At least one exemplary embodiment is directed to a method of forming an inverted bond balloon comprising: aligning a mold core with a first and a second mold shell, where the first shell has an injection port, where the first and second mold shell and the mold core are aligned using alignment recesses and pins, where when the mold core is aligned there is a gap between a portion of the mold core and the first and second mold shells, where the gap is designed to be related to a molded balloon thickness; aligning the injection port with an injection nozzle; clamping a mold against an injection nozzle; inserting a flexible material into the mold through the injection port of the mold; removing the mold from the injection nozzle; curing the material in the mold, where curing can be at least one of cooling, UV illumination, and chemical reaction; and opening the mold and removing a molded balloon with at least one inverted bond, where the molded balloon is configured so that when attached to a stent and inflated the inverted bond presses against a stent.

At least one exemplary embodiment is directed to an inverted bond balloon stent comprising: a balloon bonded to a stent, where the balloon has at least one end of the balloon inverted bonded to the stent; and a stent, where the stent is configured to provide one of air and liquid to the balloon.

At least one exemplary embodiment is directed to a pressure management system for an earpiece comprising: a first valve, where the first valve allows air to pass from a first side of the valve to a second side more readily than from the second side to the first side; an inflation channel, where the inflation channel has an outer diameter less than 5 mm; a pressure release mechanism; a pump; a stent, where the inflation channel is embedded; and a balloon, where the first valve, the inflation channel, the pressure release mechanism, the pump, and the balloon are operatively connected, where the first valve is positioned so that air from the pump passes through the first valve to inflate the balloon and where the leak rate of the air from the balloon back to the pump is less than 1% by volume per minute and where the pressure release mechanism is configured to release pressure from the balloon to the environment upon actuation, and where the pressure management system is configured to manage the inflation pressure of the balloon in an orifice.

BRIEF DESCRIPTION OF THE DRAWINGS

Exemplary embodiments of present invention will become more fully understood from the detailed description and the accompanying drawings, wherein.

DETAILED DESCRIPTION OF EXEMPLARY EMBODIMENTS OF THE PRESENT INVENTION

Figure 1:
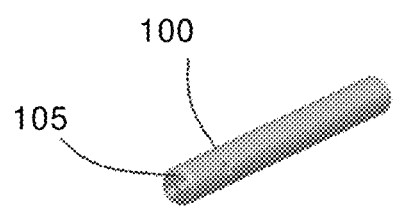
FIGS. 1 through 4 illustrate a method of bonding a balloon sheath to a stent to form an inverted bond in accordance with at least one exemplary embodiment.
Figure 2:
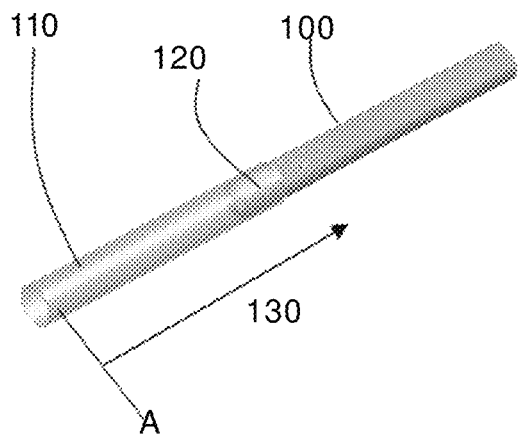
Figure 3:
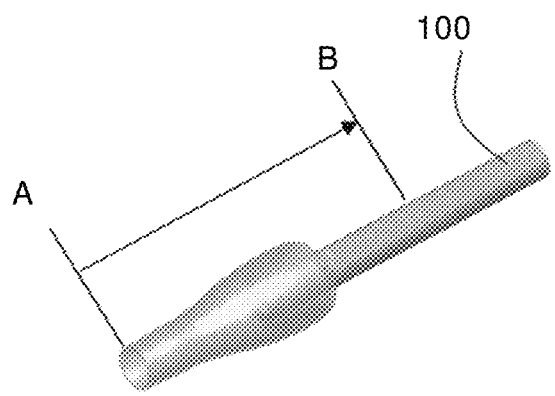
Figure 4:
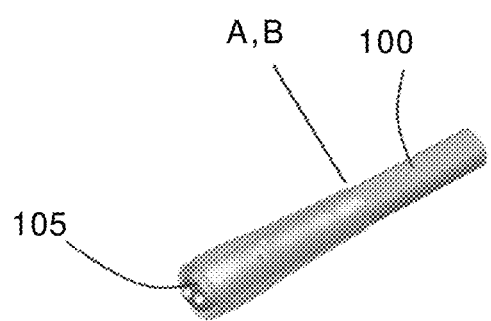

The following description of exemplary embodiment(s) is merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example specific computer code may not be listed for achieving each of the steps discussed, however one of ordinary skill would be able, without undo experimentation, to write such code given the enabling disclosure herein. Such code is intended to fall within the scope of at least one exemplary embodiment.

Additionally, the sizes of structures used in exemplary embodiments are not limited by any discussion herein (e.g., the sizes of structures can be macro (centimeter, meter, and size), micro (micro meter), nanometer size and smaller).

Notice that similar reference numerals and letters refer to similar items in the following figures, and thus once an item is defined in one figure, it may not be discussed or further defined in the following figures.

In all of the examples illustrated and discussed herein, any specific values, should be interpreted to be illustrative only and non-limiting. Thus, other examples of the exemplary embodiments could have different values.

Additionally various materials can be used for inflations channels, stents, acoustic channels, valves, balloons and pressure release mechanism. For example for examples for the stent, valves, inflation channels, and balloons a material that has a low permeability to the medium in the balloon can be used. For example Teflon can be used for an air medium. The type of material will be governed by the design criteria. For example a flexible material that has an air permeability of less than 5% loss of volume in 6 hours is SARLINK™.

FIGS. 1 through 4 illustrate a method of bonding a balloon sheath to a stent to form an inverted bond in accordance with at least one exemplary embodiment. At least one exemplary embodiment is directed to a method of invert bonding of a balloon comprising: bonding a sheath balloon 110 (e.g., of SARLINK.™. or other materials that have a low permeability to the medium (air and liquid) in the balloon) to a stent (e.g., which can be made of the same material as the balloon and which can also have a low permeability (e.g., loss of medium by volume is less than 3% in a 16 hour period) at a first bond location 120 (e.g., at the stent tip and extending inward a distance for example about 1 mm), where the sheath balloon has first surface and a second surface, where the bonding (e.g., adhesive bonding, thermal bonding, UV curing bonding, or molding the balloon and stent as one piece) at the first bond location is between the stent and a portion of the first surface, where the first surface faces the stent (FIGS. 1 and 2, where the stent 100 can have an acoustic channel 105); pulling (e.g., pulling from A in the direction of 130) the sheath balloon from an unbounded end over the first bond (from A to B, FIGS. 3 and 4) to a chosen second bond location (B) (FIG. 3) so that the first surface faces away from the stent forming an inverted bond at the first bond location; and bonding the sheath at the second bond location where the bonding (170, FIG. 5) at the second bond location is between the stent and a portion of the second surface.

Figure 5:
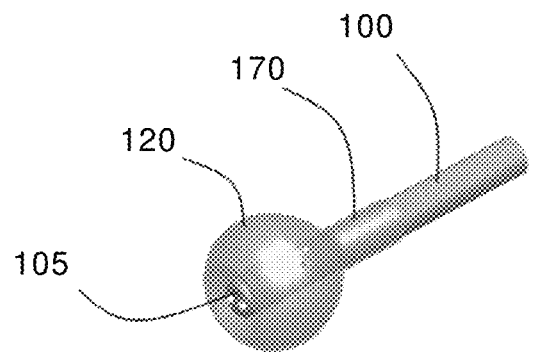
FIG. 5 illustrates an inflated balloon having an inverted bond in accordance with at least one exemplary embodiment.

Note the bond strengths are such that various balloon pressures can be maintained. For example an internal gauge pressure between 0.05 bar to 3 bar. FIG. 5 illustrates an inflated balloon 120, expanded in accordance to at least one exemplary embodiment. Note that the tip is nearly obscured (the forward portion of the inflated balloon can vary in length, it can extent completely over (e.g. align with the tip or extent over several mms) the tip (through which 105 is shown) to recessed (e.g., 1 mm from the tip) in the radial direction from the expanding balloon.

Figure 6:
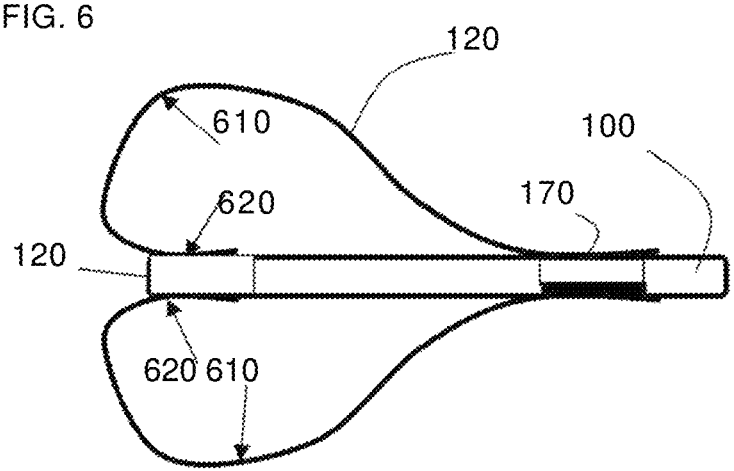
FIG. 6 illustrates the restoring force associated with an inverted bond of a balloon in accordance with at least one exemplary embodiment.

FIG. 6 illustrates how an inflated balloon with an inverted bond has the pressure presses the bond (e.g., 620) to the stent rather than try and separate the balloon from the stent as the exterior pressure (610) would do if there were not an inverted bond. This allows some force to be exerted along and/or radial to the stent on the balloon 120. Note in FIG. 6 only one inverted bond is shown (e.g., bond 170 is not an inverted bond), however at least one exemplary embodiment has bond 170 also replaced with an inverted bond, in such a situation the sheath would be moved from B to A slightly and the B end flipped to form an inverted bond.

Figure 7:
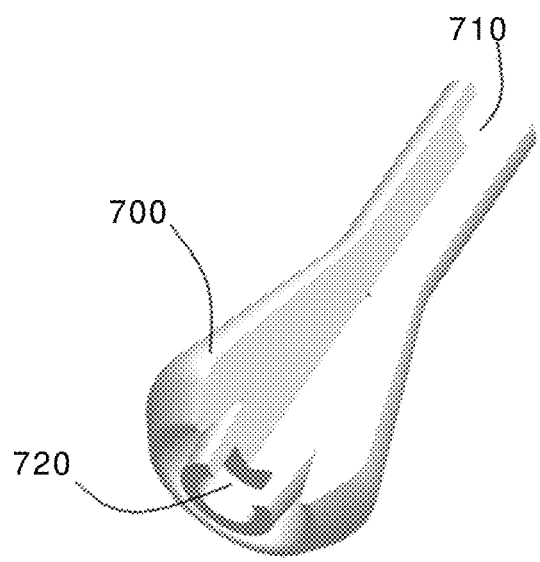
FIG. 7 illustrates a core mold associated with the molding of a balloon with an inverted bond in accordance with at least one exemplary embodiment.
Figure 8:
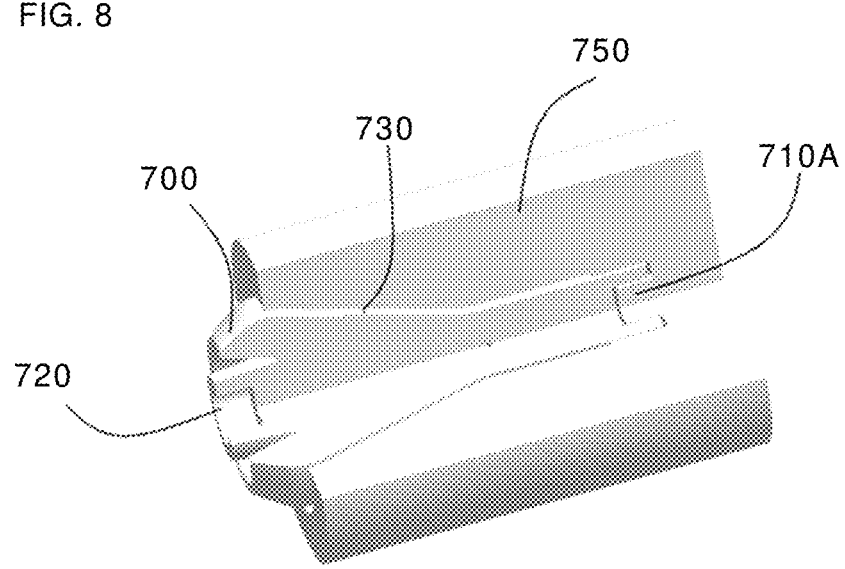
FIG. 8 illustrates the core mold inserted into one shell mold in accordance with at least one exemplary embodiment.
Figure 9:
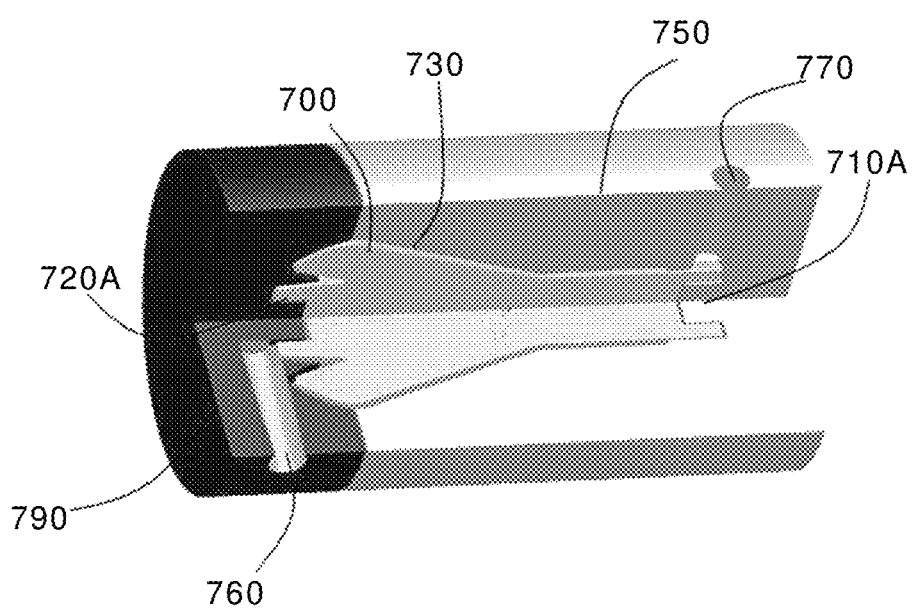
FIG. 9 illustrates a core mold inserted into two shell molds in accordance with at least one exemplary embodiment.
Figure 10:
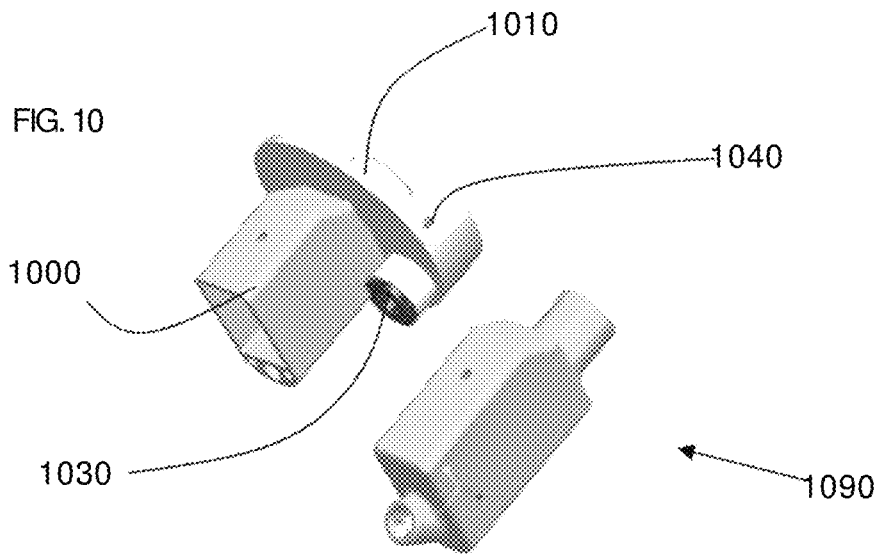
FIG. 10 illustrates a pressure management system also referred to as an inflation management system (IMS) in accordance with at least one exemplary embodiment.

In addition to bonding a sheath balloon on a stent to form an inverted bond, an inverted bond can be molded (see FIGS. 7, 8, and 9).

FIGS. 7, 8, and 9 illustrate a mold that can be used in a method of forming an inverted bond balloon. For example at least one exemplary embodiment if directed to a method of molding a balloon with an inverted bond comprising: aligning a mold core with a first and a second mold shell (750, 790), where the first shell has an injection port (760), where the first and second mold shell and the mold core are aligned using alignment recesses (710, 720) and pins (710A, 720A), where when the mold core is aligned there is a gap between a portion of the mold core and the first and second mold shells, where the gap (730) is designed to be related to a molded balloon thickness (e.g., 0.1 mm); aligning the injection port 760 with an injection nozzle; clamping a mold against an injection nozzle; inserting a flexible material into the mold through the injection port of the mold; removing the mold from the injection nozzle; curing the material in the mold, where curing can be at least one of cooling, UV illumination, and chemical reaction; and opening the mold and removing a molded balloon with at least one inverted bond, where the molded balloon is configured so that when attached to a stent and inflated the inverted bond presses against a stent.

Note that the gap 730 can be variable throughout the mold allowing one to mold variable thickness balloons. For example a region of the balloon that one would want to expand first can be thinner than another part of the balloon. Note that the material that can be used for molding can (besides satisfying the design permeability requirement set during design) be flexible. Note that the flexible material can have a linear elongation of greater than 100% without deformation of more than 5% in the area of the balloon when deflated. Some sample materials are SARLINK.™.

Note that the stent can be connected to microphones, where some can sample the ambient environment (ASM 1150), some sampling the ear canal (ECM, 1170) and receivers, some playing acoustic energy into the ear canal (ECR 1160). Note various microphones and receivers can be used, for example Knowles MEM microphones, TO and FG microphones, and TWFK receivers.

FIGS. 10 through 13 illustrate inflation management systems (also referred to as pressure management systems) in accordance with at least a few exemplary embodiments. For example at least one exemplary embodiment is directed to a pressure management system (e.g., 1090, 1100, 1200) for an earpiece (e.g., a device that is designed to be used with any part of the ear) comprising: a first valve (e.g., duck valves, one way valves, 1030, 1130A-1130F), where the first valve allows air to pass from a first side of the valve to a second side more readily than from the second side to the first side; an inflation channel, where the inflation channel has an outer diameter less than the size of an orifice in which it is to be inserted (e.g., <5 mm); a pressure release mechanism (e.g., a pin to push open the valve 1030); a pump (e.g., a manual pump (e.g., bladder), automatic pump (e.g., linear actuator) a stent, where the inflation channel is embedded; and a balloon, where the first valve, the inflation channel, the pressure release mechanism, the pump, and the balloon are operatively connected, where the first valve is positioned so that air from the pump passes through the first valve to inflate the balloon and where the leak rate of the air from the balloon back to the pump is less than 1% by volume per minute and where the pressure release mechanism is configured to release pressure from the balloon to the environment upon actuation, and where the pressure management system is configured to manage the inflation pressure of the balloon in an orifice.

Note that the stent can be as large as the inflation tube or larger.

Note that at least one exemplary embodiment can include a second valve to release pressure when the pressure in the balloon exceeds a design threshold (e.g., between 0.05 bar gauge to 3 bar gauge).

Figure 11:
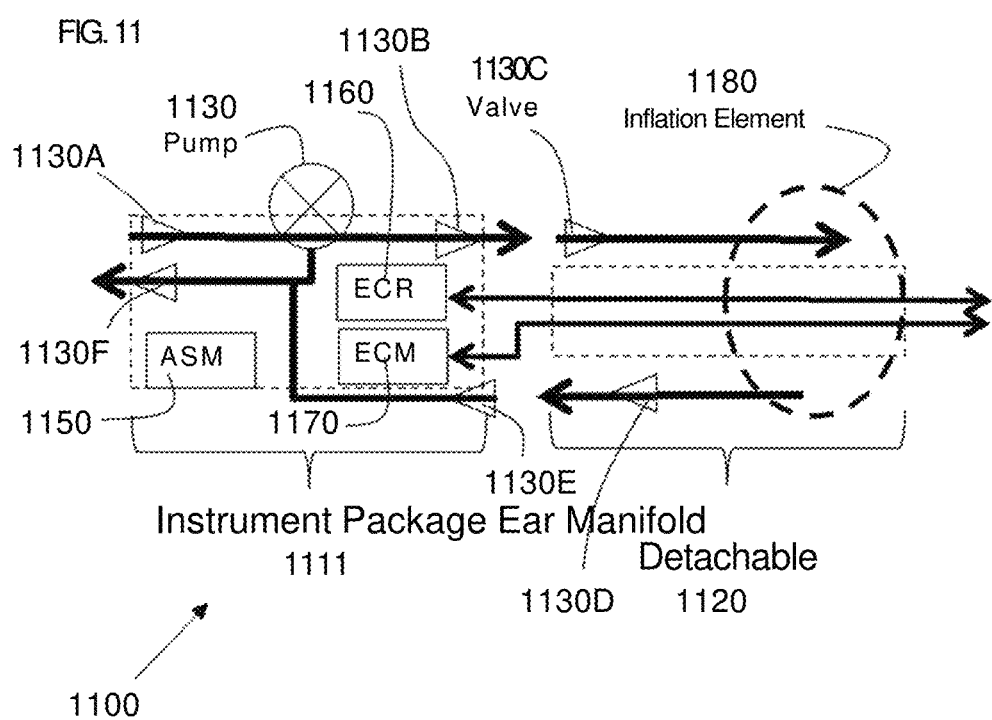
FIG. 11 illustrates a block diagram of an IMS system using a manual pump in accordance with at least one exemplary embodiment.
Figure 12:
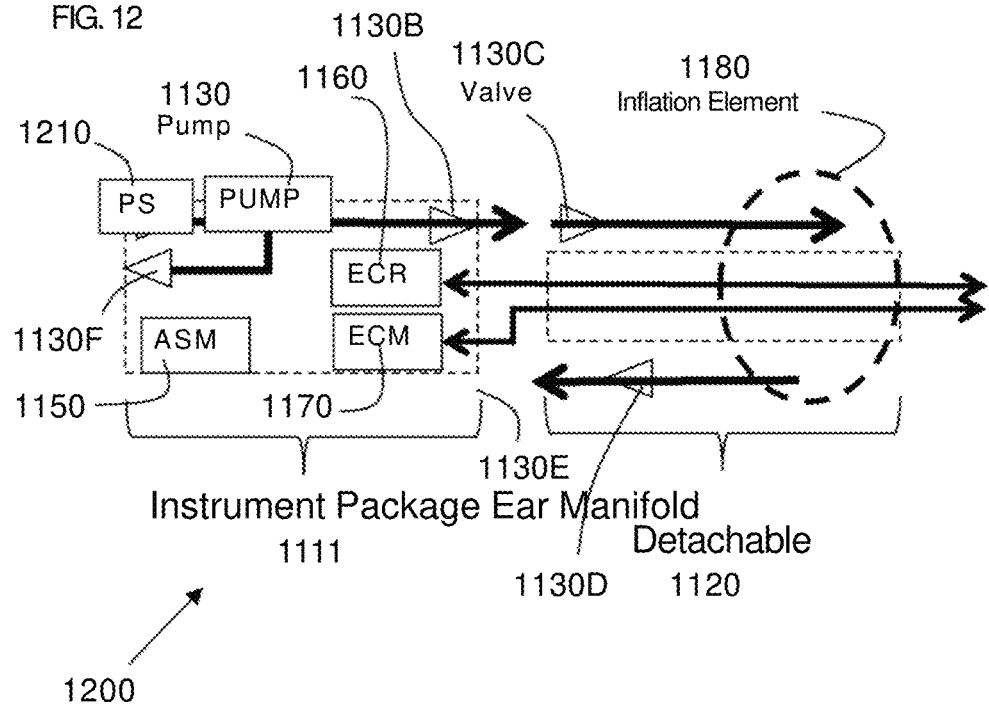
FIG. 12 illustrates a block diagram of an IMS system using a automated pump in accordance with at least one exemplary embodiment.

Note also that FIGS. 11 and 12 illustrate detachable stents and balloon systems (ear manifold 1120) from the remaining elements (instrument package 1111). A valve in the stent 1130C can allow the one way passage of medium into the balloon (e.g., inflation element 1180). A second valve 130D can release pressure if it gets above a certain value. For example if the gauge pressure exceeds 0.25 bar gauge. Note that the pump can also be connected to a release valve 1130F. For an automated pump a power source 1210 (e.g. battery) can power the pump 1130.

Figure 13:
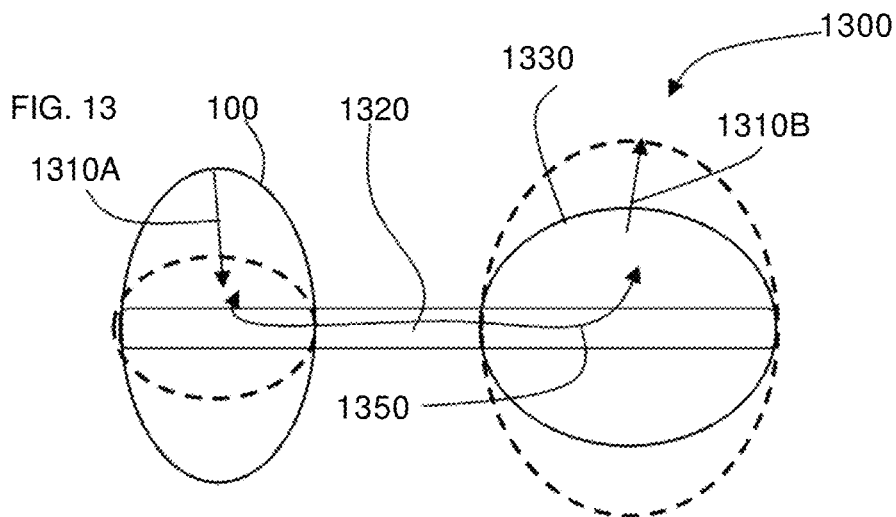
FIG. 13 illustrates a diagram of an restoring membrane based IMS in accordance with at least one exemplary embodiment.

FIG. 13 illustrates a restoring membrane exemplary embodiment, where an inflated balloon 1330, when pressed (e.g., via ear canal wall) exerts pressure on a restoring membrane 1320. The restoring membrane can provide a restoring force 1310A, which is felt by the balloon 13108 so that when the balloon is no longer pressed it will expand back to an equilibrium position. The restoring membrane can be one that has a higher elastic elongation than the balloon material, or be thinner. The restoring membrane and balloon can be pneumatically coupled 1350 through the stent 100.

Note that an earpiece can include an Ambient Sound Microphone (ASM) to capture ambient sound, an Ear Canal Receiver (ECR) to deliver audio to an ear canal and an Ear Canal Microphone (ECM) to capture and assess a sound exposure level within the ear canal. The earpiece can partially or fully occlude the ear canal to provide various degrees of acoustic isolation. In at least one exemplary embodiment, assembly is designed to be inserted into the user's ear canal, and to form an acoustic seal with the walls of the ear canal at a location between the entrance to the ear canal and the tympanic membrane (or ear drum). In general, such a seal is typically achieved by means of the balloon.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed:

1. An eartip comprising:
a sealed element where the sealed element encompasses a first chamber, where the first chamber is connected to a second chamber that is part of an earphone, where the second chamber is encompassed by a flexible membrane and where the second and the first chamber form a sealed system when connected together, whereupon when the sealed element is deformed the flexible membrane is deformed providing a restoring force to the sealed element; and
a stent, where the sealed element is attached to the stent, where the stent is configured to be attached to and removable from the earphone, where the stent includes a first and second acoustic channel, where the first acoustic channel is configured to be coupled to a microphone and the second acoustic channel is configured to be coupled to a speaker when the eartip is connected to the earphone, where the earphone is wirelessly connected to a communication device.

2. The eartip according to claim 1, where the sealed element is composed of a flexible material.

3. The eartip according to claim 2, where the sealed element encloses a gas.

4. The eartip according to claim 3, where the gas passes between the first chamber and the second chamber.

5. The eartip according to claim 4, where the eartip is configured so that when the first chamber is deformed it forces gas from the first chamber to the second chamber.

6. The eartip according to claim 5, where the second chamber is deformed when the gas from the first chamber is forced from the first chamber to the second chamber.

7. The eartip according to claim 2, where the sealed element encloses a liquid.

8. The eartip according to claim 2, where the sealed element is made from silicone.

9. The eartip according to claim 2, where the first chamber has a first elongation value and the second chamber has a second elongation value, where the first elongation value is greater than the second elongation value.

10. The eartip according to claim 9, where the first elongation value is greater than 100%.

11. The eartip according to claim 2, where the first chamber has a first elongation value and the second chamber has a second elongation value, where the first elongation value is less than the second elongation value.

12. The eartip according to claim 11, where the first elongation value is less than 50%.

13. The eartip according to claim 1 where the second chamber is connected to the first chamber by an inflation channel passing through the stent when the earphone is connected to the eartip.

* * * * *